United States Patent
Niesen

[19]
[11] Patent Number: 6,014,172
[45] Date of Patent: Jan. 11, 2000

[54] OPTIMIZED VIDEO COMPRESSION FROM A SINGLE PROCESS STEP

[75] Inventor: Joseph W. Niesen, La Mirada, Calif.

[73] Assignee: TRW Inc., Redondo Beach, Calif.

[21] Appl. No.: 08/823,288

[22] Filed: Mar. 21, 1997

[51] Int. Cl.⁷ .................................. H04N 7/36
[52] U.S. Cl. ..................... 348/402; 348/405; 348/416
[58] Field of Search .................... 348/384, 390, 348/400, 401, 402, 403, 404, 405, 407, 415, 416, 420; H04N 7/36

[56] References Cited

U.S. PATENT DOCUMENTS

| | | | |
|---|---|---|---|
| 5,121,191 | 6/1992 | Cassereau | 348/441 |
| 5,223,926 | 6/1993 | Stone et al. | 348/396 |
| 5,227,878 | 7/1993 | Puri et al. | 348/416 |
| 5,293,434 | 3/1994 | Feig et al. | 382/234 |
| 5,361,105 | 11/1994 | Iu | 348/416 |
| 5,367,629 | 11/1994 | Chu et al. | 348/400 |
| 5,424,779 | 6/1995 | Odaka | 348/416 |
| 5,428,693 | 6/1995 | Murakami et al. | 348/415 |
| 5,452,104 | 9/1995 | Lee | 348/404 |
| 5,530,661 | 6/1996 | Garbe et al. | 708/420 |
| 5,933,193 | 8/1999 | Niesen | 348/401 |
| 5,936,669 | 8/1999 | Niesen | 348/401 |

OTHER PUBLICATIONS

The MPEG standard (www.crs4.it/~luigi/mpeg/mpeg2.html).

MPEG-2 FAQ version 3.7 (May 11, 1995); by Chad Fogg (efogg@chromatic.com).

Pennebaker & Mitchell JPEG: Still Image Data Compression Standard, Chapter 4—The Discrete Cosine Transform (DCT)—(1993).

Visual Psychophysics, Digital Pictures: Representation and Compression Chapters 3 and 4—Netravali & Haskell (1988).

IEEE Transactions on Electromagnetic Compatibility, vol. EMC–18, No. 1, Feb. 1976.

IEEE Transactions on Image Processing, vol. 3, No. 5, Sep. 1994 Entitled Three–Dimensional Subband Coding with Motion Compensation by Jens Rainer Ohm, Member, IEEE.

IEEE Transactions on Image Processing, vol. 3, No. 5, Sep. 1994 Entitled Multirate 3–D Subband Coding of Video by David Taubman and Avideh Zakhor.

*Primary Examiner*—Howard Britton
*Attorney, Agent, or Firm*—Michael S. Yatsko

[57] ABSTRACT

A method of optimizing data compression in a data compression process. A single compressor is provided for performing video signal data compressor operations (122). The compressor receives a video signal that includes spatial and temporal data from a plurality of video signal frames. The compressor performs motion compensation (124, 126) on the plurality of video frames by simultaneously registering the plurality of video signal frames to produce a plurality of motion vectors. A performance metric including energy compaction parameters is then generated from the plurality of motion vectors (128). The performance metric is applied to the motion compensation step (124, 126) to optimize rate distortion performance in the motion compensation step and in subsequent data compression process steps.

16 Claims, 4 Drawing Sheets

OPTIMIZED VIDEO COMPRESSION FROM A SINGLE PROCESS STEP

BACKGROUND OF THE INVENTION

1. Technical Field

This invention relates generally to digital video signal compression, and more particularly to a method of digital video signal energy compaction method that determines rate distortion performance during the initial motion compensation step, thereby achieving a high signal compression ratio and a low transmission rate.

2. Discussion

Present video applications require large amounts of data to be transmitted at high bit rates and with a minimal amount of signal distortion. For example, the uncompressed data bit rates for digital video, such as VCR-grade video (SIF), broadcast television video (CCIR-601) and high definition television (HDTV) are 4 Mbps, 15 Mbps, and 16Mbps, respectively. In an uncompressed state, these data bit rates are too high to allow such video signals to be transmitted and processed in a commercially feasible manner. Therefore, in order to process such video signals in a practical manner, such video signals must be compressed prior to being transmitted.

In response to the proliferation of video based applications and products, an industry wide need for creation of a standard video signal compression syntax arose. A group under the International Standards Organization (ISO), known informally as the Moving Pictures Experts Group (MPEG), was formed to define standards for digital video and audio compression. MPEG has created a standardized syntax by defining the content of a compressed video signal bit stream and the method of decompressing the bit stream subsequent to its transmission. The methods of compression, however, have not been defined, thus allowing individual manufacturers to develop various methods of actually compressing the data bit stream within the defined standards.

MPEG has to date defined two syntaxes widely used in the digital videos industry. A syntax known as MPEG-1 was defined to be applicable to a wide range of bit rates and sample rates. Particularly, MPEG-1 is suitable for use in CD/ROM applications and other non-interlaced video applications having transmission rates of about 1.5 Mb/s. A second syntax known as MPEG-2 was defined for representation of broadcast video, and other video signal applications having coded bit rates of between 4 and 9 Mb/s. MPEG-2 syntax is also applicable to applications such as HDTV and other applications requiring efficient coding of interlaced video.

While the above discussed MPEG-1 and MPEG-2 syntaxes exhibit adequate performance characteristics, the ongoing evolution of digital video dictates the need for further advancement in the art, as the present MPEG video syntax definitions do have associated limitations. For example, temporal redundancy, a phenomenon which enhances video compression by minimizing data bit rate transmission for non-changing video pixels, is an efficient method of maximizing video signal compression. Present MPEG-1 and 2 data compression-based methods utilize temporal compression.

However, the MPEG-1 and 2-based temporal compression is based on a frame by frame judgement basis so that the methods do not take full advantage of temporal compression. In particular, commercially standard MPEG-1 and MPEG-2 syntaxes only partially utilize temporal redundancy. In addition, present MPEG syntax requires numerous optimization variables (such as predictive frame, bi-linear frame and intraframe variables) to be calculated, transmitted and then decoded by MPEG signal decompressors. The use of these numerous variables adds both computational time and complexity to the data compression. Also, while many current MPEG syntaxes exhibit an associated bit rate compression of as high as 30:1, increasingly complex and data-intensive video applications require higher compression rates for real-time processing. Although data compression methods claiming compression ratios as high as 200:1 do exist, such methods subsample an array of pixels in a video frame sequence (i.e., throw away every other pixel) and utilize other shortcuts to achieve high compression.

Further, in the above-discussed MPEG-1 and MPEG-2 syntaxes, a data compression optimization operation known as Block Matching Algorithm (BMA) is the most computationally intensive operation in the MPEG video compression process. The BMA operation, although it is exhaustive, requires an inordinate amount of processing power. For example, LSI Logic of Milpitas, Calif. presently manufactures a ASIC chip, commercially sold under the name AMEP, which is capable of performing computations at a rate equivalent to 500 Intel Pentium 166 MHz processors. Two of these chips are required just to perform the BMA step, while typically only three additional chips are required to perform the remaining data compression calculations. As a result, the MPEG-2 committee has recently called for new alternative methods to improve upon the existing Block Matching Algorithm (BMA), both to lessen the complexity of the data compression operation and to lower the associated data transmission rate.

Data compression optimization methods which minimize data transmission rate do exist. For example, pending U.S. patent application entitled "Method and System of Three Dimensional Compression of Digital Video Systems", Ser. No. 08/621,855 by Niesen, now U.S. Pat. No. 5,933,143 assigned to TRW, Inc., which is incorporated by reference, discloses video data compression optimization methods performed after video compression transform operations by optimizing video compression based on transform coefficient transmission order. The methods are realized in the final steps of the process after motion compensation and the transform coefficients have been calculated.

While compression methods such as those identified above represent a significant advancement in data compression, there is still room for advancement in the art. In particular, there is a need for a data compression maximization method that is realized in the initial steps of the data compression process to minimize rate distortion as early in the process as possible to thereby optimize the data compression achieved in subsequent steps.

SUMMARY OF THE INVENTION

In accordance with the teachings of the present invention, a method of optimizing digital video signal compression is provided. The method of the present invention exhibits a higher compression ratio than current MPEG standards. At the same time, the method can be a less computationally intensive operation than the conventional BMA. In particular, the video signal compression method of the present invention, which is based on a first order Markov model, maximizes signal rate distortion performance early in the compression process by applying a compaction performance metric to the data compression motion compensation step. Because the motion compensation step is linked directly to rate distortion performance of all remaining data compression steps, data compression is increased. The method may be realized in an MPEG compatible format, thereby allowing the method to be used with current digital video signal applications.

In the inventive approach, a method is provided for compressing a digital video signal. In its present form, the method uses a subset of Discrete Cosine Transform (DCT) coefficients generated in the compression process to approximate the status of remaining coefficients. The method includes the step of providing a compressor for performing video signal data compression operations. A video signal is received at the compressor and includes spatial and temporal data from a plurality of video signal frames. The compressor compensates for motion in the plurality of video frames, and generates a performance metric to maximize energy compaction. The compressor applies the performance metric at the step of compensating for motion to optimize rate distortion performance in subsequent data compression process steps.

BRIEF DESCRIPTION OF THE DRAWINGS

Other objects and advantages of the invention will become apparent upon reading the following detailed description and upon reference to the drawings, in which.

DETAILED DESCRIPTION OF THE PREFERRED EMBODIMENT

Figure 1A:
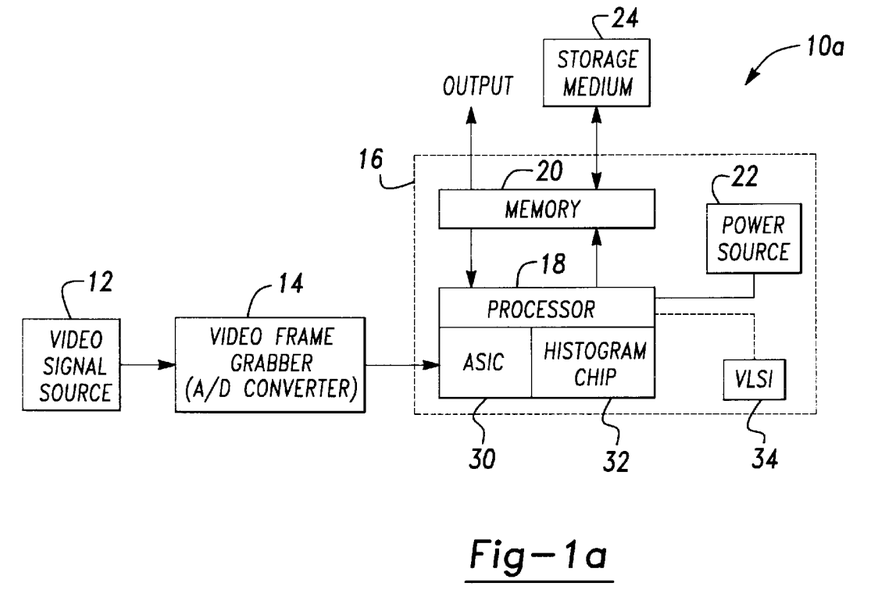
FIGS. 1a and 1b are block diagrams for the signal compressor and decompressor, respectively, in which the signal compression methods of the present invention are realized.
Figure 1B:
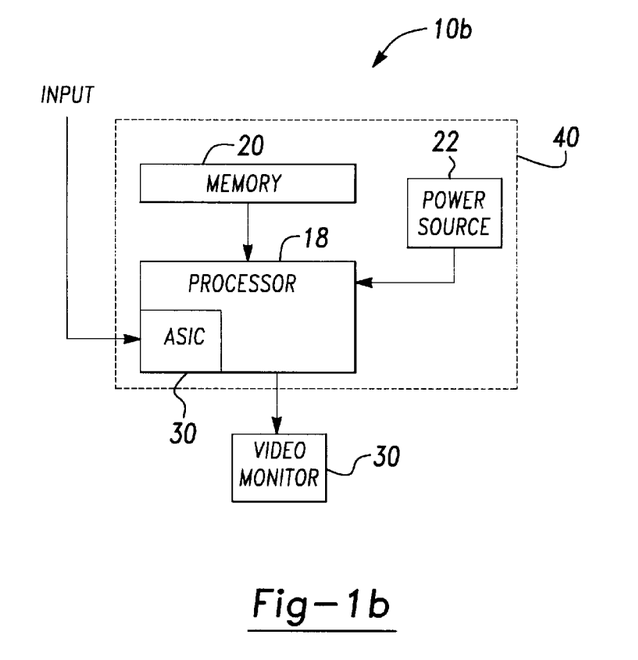

Referring generally to FIGS. 1a–1b, a system in which the preferred embodiment of the present invention is realized is shown generally at 10a and 10b. The data compression method of the present invention maximizes data compression by applying a compaction performance metric, discussed in detail below, to a motion compensation step in the data compression operation to maximize data compression by minimizing rate distortion through the remaining compression steps. As a result, complexity of the data compression operation is greatly reduced and the compression ratio is greatly increased when compared to present MPEG-based methods.

Referring in particular to FIG. 1a, the video signal is generated at a video signal source 12. It is contemplated that this video signal source could be any source of a digital video signal, or an analog video signal that may be later converted to digital through means such as an analog-to-digital video frame grabber 14. Such a video signal source may include, but is not limited to, a video cassette recorder (VCR), a CD ROM, broadcast television signal generator, a high definition television signal generator, or any type of computer network application or other real-time digital video source. The digital video signal generated from the video signal source 12 and/or the video frame grabber 14 is then input into a signal compressor, indicated generally at 16. The signal compressor includes a processor 18, a memory 20, and a power source 22. Also, an external storage medium, such as a central hard drive 24, may be operatively connected to the CPU to add further computation and memory capabilities to the compressor.

Preferably, the above described signal compressor is preferably a Sun Sparc 10 Workstation. However, it should be appreciated that other computers, such as an IBM or IBM compatible personal computer having a Intel Pentium® processor chip or any other processing unit having equivalent processing capabilities can also be utilized to implement the data compression method of the present invention. The method of the present invention may be programmed into one of the above signal compressors using ANSI C programming language. However, it should also be appreciated that any other computer language capable of implementing the present method may be used.

In addition to the processor 18, the signal compressor also includes an application specific integrated circuit (ASIC) 30 for performing discrete cosine transforms (DCT) or other transform operations in accordance with the preferred method of the present invention as will be described below. The signal compressor 18 may also include a histogram chip 32 which may be utilized for forming histograms for data transmission purposes, such as those described in pending patent application Ser. No. 08/621,855 to Niesen which has been incorporated by reference.

It should be appreciated that the energy compaction method may be realized through the processor 18 via conventional software programming techniques. Alternatively, the energy compaction method of the present invention may be realized through implementation of VLSI hardware, such as the VLSI chip shown at 34. Realization of the present invention through software, hardware, or a combination of both involves tradeoffs between overall system expense and processing speed, as is well known in the art.

Referring to FIG. 1b, a signal receiver is shown generally at 10b. The signal receiver includes a signal decompressor, shown generally at 40. As with the signal compressor, the decompressor may be a Sun Sparc 10 Workstation, an IBM personal computer with an Intel Pentium® processor, or any other processing unit having similar processing capabilities.

It should be appreciated that the compressor and the decompressor may in fact be the same processor, and that the decompressor undoes what the processor does. The decompressor includes a processor 42 for performing inverse transforms to reconstruct the compressed video frames transmitted from the signal compressor 16. Specifically, an ASIC 44 performs these inverse transforms. The processor 42 also includes a memory 46 and a power supply 48, of the type well known in the art. A video monitor 50 is also connected to the processor 42 for displaying the transmitted, reconstructed video frames. The video monitor is of the type well known in the art and may be a television, a computer display, or any other commercially available pixel-based video screen.

Figure 2:
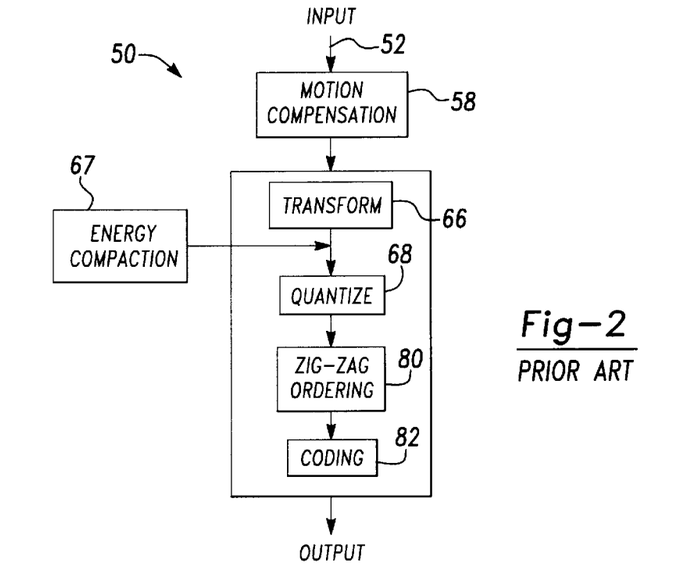
FIG. 2 is a flow diagram of a prior art MPEG data compression process.
Figure 3:
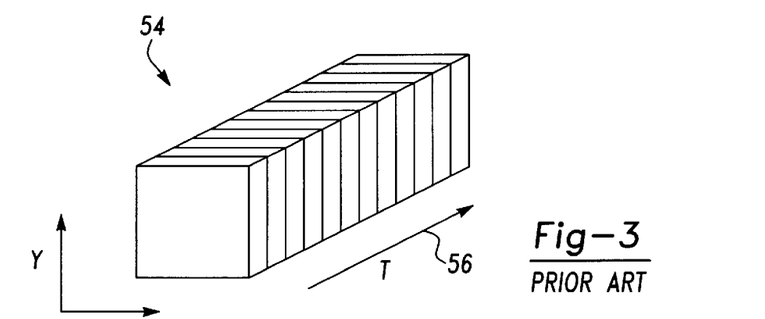
FIG. 3 illustrates a group of video frames processed by the motion compensation step of the MPEG-2 data compression process illustrated in FIG. 2.
Figure 4:
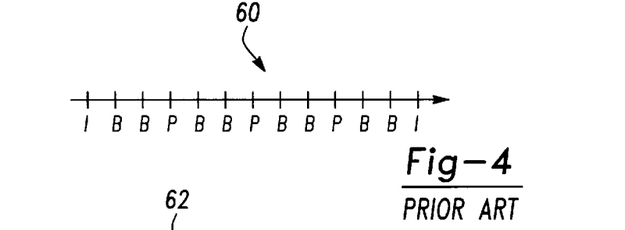
FIG. 4 illustrates the motion compensation grouping of the frames of FIG. 3.
Figure 5:
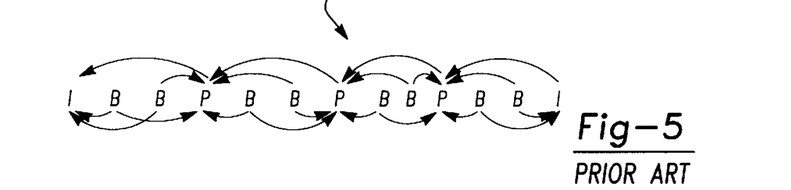
FIG. 5 illustrates the motion compensation processing sequence of the frames of FIG. 3.

Referring to FIG. 2, a diagram illustrating the steps of a conventional MPEG-2 based data compression process is shown at 50. At 52, a sequential group of video frames, generated by the video signal source 12 and shown generally at 54 in FIG. 3, is input into the signal compressor 16. Each of the video frames represents a temporally successive arrangement of pixels, as indicated by the time designation 56 in FIG. 3 and as is well known in the art. As shown in FIG. 2, in accordance with conventional MPEG-2 syntax, after being input into the compressor, the sequence of frames is subjected to a motion compensation analysis at step 58. The general mathematical representation of the motion compensation is as follows. The displacements $\Delta x_n$ and $\Delta y_n$ for motion compensation of a macroblock frame n ($s_n$) with respect to a macroblock from frame O ($S_o$) are:

$$\text{minimum} \sum_{y=o}^{15} \sum_{x=o}^{15} |S_o(x + \Delta x_n y + \Delta y_n) - S_n(x, y)|^2$$

over all possible $\Delta x_n$, $\Delta y_n$ within a window of pixels, which is preferably 16 pixels by 16 pixels, in frame $S_o$. The initial (I) frame is used as a reference frame $S_o$, as shown at 60 in FIG. 4. The remaining frames $S_n$ are treated as either predicted (P) frames or bilinear interpolated (B) frames. The window of pixels is moved around each of the frames to generate data for the above equation, and, as shown at 62 in FIG. 5, motion compensation is performed on the group of frames two frames at a time in a predetermined sequence.

Referring again to FIG. 2, at 66, a two-dimensional discrete cosine transform (DCT) is performed on the data contained within the frames to transform the data from the spatial position domain to the spatial frequency domain. The two-dimensional spatial DCT of the plurality of video frames is indexed by the "time tag" index t.

$$c_{uvt} = \frac{D(U)}{2} \frac{D(V)}{2} \sum_{y=o}^{N-1} \sum_{x=o}^{N-1} s(x, y, t) \cos\left[\frac{(2X+1)U\pi}{2N}\right] \cos\left[\frac{(2y+1)V\pi}{2N}\right]$$

where N is the number of frames in the group of frames, and:

$$D(V) = \frac{2\sqrt{2}}{N} \text{ for } v > o$$

$$D(U) = \frac{2}{\sqrt{N}} \text{ for } u = o;$$

$$D(V) = \frac{2}{\sqrt{N}} \text{ for } v = o;$$

-continued $$D(u) = \frac{2\sqrt{2}}{N} \text{ for } u > o;$$

Figure 6:
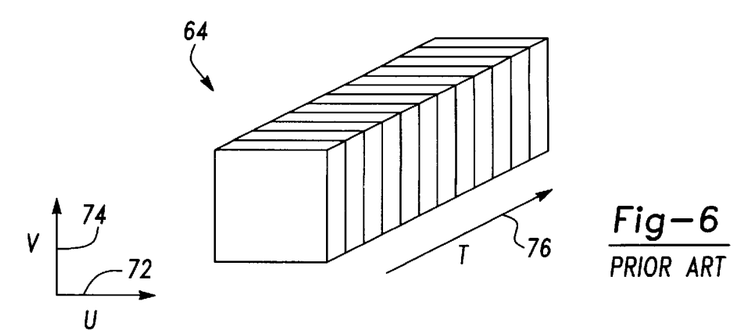
FIG. 6 illustrates the group of video frames of FIG. 3 after being subjected to a 3-D discrete cosine transform.

Also at 66, a one-dimensional discrete cosine transform is performed on the data in the video frames in the temporal dimension to effectively produce a "temporal frequency tag" for each of the spatial transform coefficients. As a result, the group of frames shown in FIG. 3 is transferred from the temporal domain to the frequency domain, as shown at 64 in FIG. 6.

Figure 7:
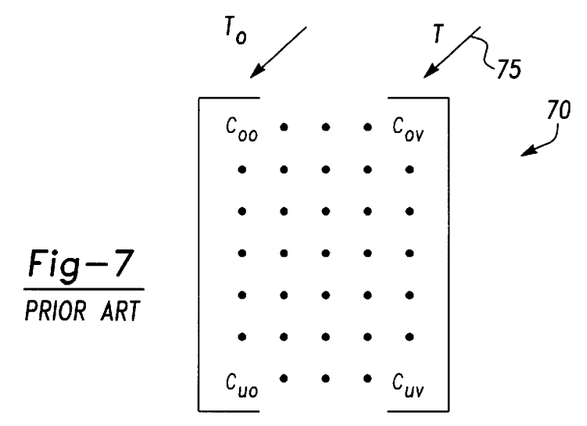
FIG. 7 shows a three-dimensional quantization matrix containing three-dimensional coefficients after a one dimension discrete cosine transform is performed on all of the video frames of FIG. 3.

After the transform process, an energy compaction calculation is performed at 67. The compaction process optimizes the correlation between transform coefficients in the higher and lower bands and places most of the coefficient energy in the lower bands for properly motion compensated blocks. The compaction process also involves a double penalty: 1. suboptimality due to the BMA used for motion compensation and 2. the requirement that residual motion error be transformed efficiently. The resulting data for each video frame is quantized and input at 68 into a two-dimensional quantization matrix as shown generally at 70 in FIG. 7. Each of the resulting matrices typically includes twelve coefficients per row, indicated by the arrow U at 72 in FIG. 6, and twelve coefficients per column, indicated by the arrow V at 74, corresponding to the group of twelve video frames.

At 80 in FIG. 2, the processor determines the probability of each coefficient being zero for the particular processed group of frames and arranges the coefficients accordingly in a zig-zag transmission block order utilized in conventional MPEG-2 data compression methods.

Subsequent to the coefficients being arranged in the above-described zig-zag order transmission block in the quantization matrices, optimal distortion and transmission rate calculations are performed on the data to be transmitted to the signal decompressor 42. At 82, the MPEG-2 syntax performs a two dimensional zero run length coding on the zig-zag ordered coefficients to optimize the zero run length for each group of twelve frames. As a result, the transmitted compressed bit stream includes an ordering with the coefficient having the least probability of being zero being first transmitted, and with the coefficients having the least probability of being zero being transmitted in increasing probability order. In the zig-zag order, the first row of the first matrix of quantized coefficients is the column from the processed group of frames with the least number of zeros. The second row of the first matrix of the quantized coefficients is the column from the processed group of frames with the second least number of zeros. The remaining rows of the first matrix are filled out with similar ordering regarding number of zero coefficients in a column. Rows of the second matrix are filled, if there are any remaining columns, with non-zero coefficients. This zero run length coding minimizes the amount of data having no associated energy, and represented by coefficients having a zero value, being transmitted.

The data transmission rate is calculated at 82 using calculations typically based on standard MPEG syntax. However, the transmission rate may be determined through methods such as the three-dimensional transmission rate method described in the pending U.S. patent application Ser. No. 08/621,855 to Niesen, which has been incorporated by reference. The entropy calculations slightly overestimate the transmission rate. The MPEG method typically calculates rate determination using Huffman coding, which is realized through the following equation:

$$\text{Rate} \leq H(\underline{p}) + \sum_i \frac{H(p_i)}{L_i}$$

where $L_i$ is the zero run length plus one and $p_i$ is the probability of a sum of $_I$ zeros.

The above-described MPEG-2 syntax utilizes energy compaction in association with the ordering of the quantized coefficients in the quantization matrices, and therefore does not take full advantage of the energy compaction. It is important that the energy compaction step is performed as early on the data compression process as possible, as the optimal performance of the ordering and coding steps is increased if signal coefficients input into the steps exhibit good energy compaction. As will now be described, the data compression method of the present invention optimizes data compression by combining the energy compaction process step with the data compression motion compensation step, thereby fully exploiting the advantages associated with the energy compaction.

Figure 8:
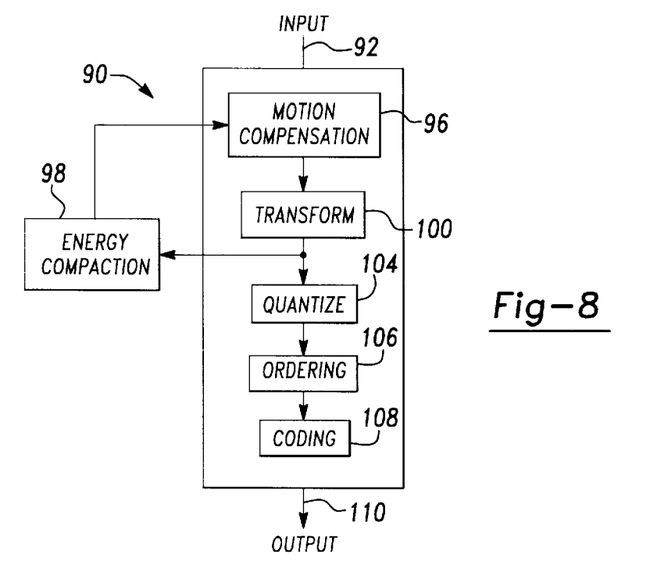
FIG. 8 is a flow diagram of a data compression process utilizing energy compaction in the motion compensation step according to a preferred embodiment of the present invention.
Figure 9:
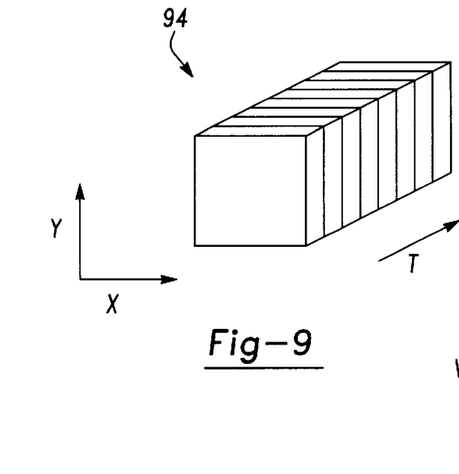
FIG. 9 illustrates a group of video frames processed by the motion compensation step of the data compression process illustrated in FIG. 3.

Referring to FIG. 8, a preferred embodiment of the methodology used to realize the optimized data compression method of the present invention is shown generally at 90. The methodology of the present invention at 92 receives a set of digitized video frames, shown at 94 in FIG. 9, and performs motion compensation on the frames at 96. The number of frames comprising a processed group preferably is 8, but may range from 2 to N, where N is an even integer depending upon the video processing application and the memory available to support storing N frames. The motion compensation step according to the present invention is based on a first order Markov model for temporal intensity variation and therefore matches frame trends in the group of frames being processed, as opposed to the more narrowly-focused temporal minimization of the differences in two successive frames associated with conventional MPEG-2 syntax. As a result, it more accurately processes frame data typically associated with pixel data input from camera zooming or panning operations. For example, a scene having a progressive enlargement of an object due to focussing will experience a sequential increase/decrease in average luminance intensity. Such a scene change would be best handled by the proposed invention.

Figure 10:
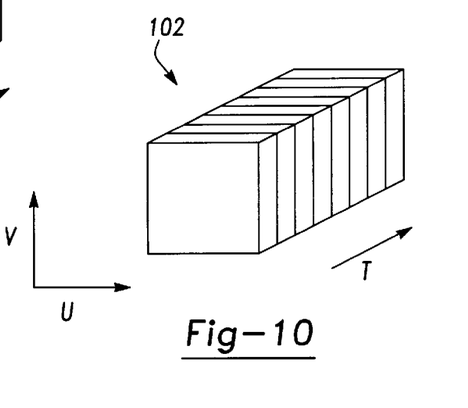
FIG. 10 illustrates the group of video frames of FIG. 9 after being transformed from the spatial domain to the frequency domain.

Energy compaction is performed on the frame data at 98 on the temporal frequency tag described above in conjunction with the motion compensation step and prior to the transformation at 100 of the data from the temporal to the frequency domain, as shown at 102 in FIG. 10. Integrating the energy compaction process into the motion compensation step prior to the transform process thereby allows energy compaction dependent steps, such as the quantizing, ordering and coding steps similar to those discussed above and shown at 104, 106 and 108, to maximize data compression, because motion compensation effects on energy compaction are optimized before the compressed video data is output at 110 and before step 100.

Realization of the methodology of the present invention will now be discussed. Referring in particular to the transform step 100 shown in FIG. 10, the majority of coefficient energy for the 3-D DCT transform resides in the temporal coefficients S(0,0,w) and in the S(u,v,0) coefficients. The S(0,0,w) coefficients can be expressed as the difference of pixel intensities from blocks of various combinations of two frames within the set of the group of pictures. The cost metric for motion compensation as discussed below is the energy compaction, as measured by an estimate of the basis restriction error (BRE) for S(0,0,w) coefficients. The S(0,0,0) coefficient is not included in the energy compaction optimization since it does not involve frame differences. Since the S(0,0,4) coefficient requires that four frame difference variables be generated just to optimize it, it is also not included in the energy compaction optimization.

The use of the coefficient energy compaction method of the present invention is an extension of the 2-dimension temporal MPEG predictive coding method that conventionally utilizes a BMA method as discussed above. The BMA minimizes the energy in the frame difference of macroblocks. For two frames, the temporal high frequency coefficient for S(0,0,1) is expressed as $$S(0,0,1) = \frac{2}{N} \sum_{x=0}^{x=N-1} \sum_{y=0}^{y=N-1} s(x,y,t=0) - s(x,y,t=1)$$

The energy of the S(0,0,1) coefficient is the product of N and the square of the above expression. The cost criteria for the BMA used in MPEG is the energy contribution of the high frequency coefficient, expressed by the s(0,0,1) expression, when x'=x and y'=y. Thus, the BMA acts to minimize a portion of the BRE for two frames. The motion compensation method of the present invention is extended to greater than two frames ($N_t$>2), using the BRE estimate as the motion compensation performance metric.

The motion compensation method of the present invention is motivated by the concept that the BMA approximately minimizes the energy in the high temporal frequency subband for two frames. The minimization of high temporal frequency energy is extended to greater than two frames by minimizing the BRE in the set of S(0,0,w) coefficients, where S(0,0,w)=

$$\left( \sum_{t=0}^{N_t-1} \cos\frac{2t+1\pi w}{2N_t} \left( \sum_{x=0}^{7} \sum_{y=0}^{7} s(x,y,t) \right) \right)$$

Though the idea can be applied to any even number of frames, it is applied to a set of eight frames in the following analysis. The transform method proposed here could also be applied to a 3-D coefficient vector with u≠0v≠0, such as S(1,1,w). For this case, $$s(1,1,w) = \sum_{t}^{N_t-1} \cos\frac{(2t+1)\pi w}{2n_T} \left( \sum_{X}^{N-1} \sum_{Y}^{N-1} S(x,y,t)\cos\frac{3\pi x}{2N}\cos\frac{3\pi y}{2N} \right)$$

or $$S(1,1,w) = \sum_t \sum_x \sum_y \frac{1}{4} s(x,y,$$
$$t) \left[ \cos\frac{(2t+1)\pi w + 3\pi(x+Y)}{16} + \cos\frac{((2+1)\pi w) - (3\pi(x+Y))}{16} + \right.$$
$$\left. \cos\frac{(2t+1)\pi w + 3\pi(x-y)}{16} + \cos\frac{(2t+1)\pi w - (3\pi(x-Y))}{16} \right]$$

The S(1, 1, W) can be segregated into pixel groupings that are differences scaled by the same constant.

The method purposed here applies to Discrete Sire and Discrete Furrier Transforms also.

In the present invention, frame differences are properly weighted and summed to form 3-D DCT coefficients as follows:

S(0,0,1)=0.98γ3+0.83γ4+0.55γ5+0.19γ6

$S(0,0,2)=1.84\gamma1-0.92\gamma3+0.38\gamma4-0.38\gamma5+0.38\gamma6$ $S(0,0,3)=0.83\gamma3+0.19\gamma4-0.98\gamma5-0.55\gamma6$ $S(0,0,5)=0.55\gamma3-0.98\gamma4+0.19\gamma5+0.83\gamma6$ $S(0,0,6)=0.54\gamma1-0.92\gamma2-0.92\gamma3+0.54\gamma4-0.54\gamma5-0.92\gamma6$ $S(0,0,7)=0.19\gamma3-0.54\gamma4+0.83\gamma5-0.98\gamma6$ The random variables γ1, γ2, γ3, γ4, γ5, and γ6 are the difference of N-by-N blocks of pixels, and are defined as:

$$\gamma_1 = \frac{1}{N} \sum_{x=0}^{x=N-1} \sum_{y=0}^{y=N-1} s(x', y', 0) - s(x, y, 3)$$

$$\gamma_2 = \frac{1}{N} \sum_{x=0}^{x=N-1} \sum_{y=0}^{y=N-1} s(x', y', 1) - s(x, y, 2)$$

$$\gamma_3 = \frac{1}{N} \sum_{x=0}^{x=N-1} \sum_{y=0}^{y=N-1} s(x', y', 0) - s(x, y, 7)$$

$$\gamma_4 = \frac{1}{N} \sum_{x=0}^{x=N-1} \sum_{y=0}^{y=N-1} s(x', y', 1) - s(x, y, 6)$$

$$\gamma_5 = \frac{1}{N} \sum_{x=0}^{x=N-1} \sum_{y=0}^{y=N-1} s(x', y', 2) - s(x, y, 5)$$

$$\gamma_6 = \frac{1}{N} \sum_{x=0}^{x=N-1} \sum_{y=0}^{y=N-1} s(x', y', 3) - s(x, y, 4)$$

where $x'=x+\delta x$, $y'=y+\delta y$, and $\delta x$ and $\delta y$ are allowed displacements within the reference frame.

In the $\gamma_1$ expression, $s(x,y,3)$ is a search frame while $s(x',y',0)$ is a reference frame in the expansion for $\gamma_6$. Assuming that the frame difference $\gamma_1$ is small, $s(x',y',0)$ can be used to approximate $s(x',y',3)$. In the expression for $\gamma_4$ and $\gamma_6$, the reference frames $s(x',y',2)$ and $s(x',y',3)$ can be approximated by $s(x',y',1)$ and $s(x',y',0)$, respectively. Using the suggested substitution for reference frames in $\gamma_4$ and $\gamma_6$, six displacement vectors are generated. Reference frames 1 and are used in their original state in subsequent video compression process steps. Using the aforementioned approach, the frames 0 and 1 can be used as reference frames for 3-D motion compensation of a group of eight frames (See FIG. 13).

The objective of the motion compensation/energy compaction method of the present invention is to position the blocks from the group of eight frames within the search range of the reference frame to minimize the BRE of the coefficient vector $s_{00}$.

Thus, the basis restriction error (BRE), which essentially defines energy compaction capability, is expressed as:

$$BRE = \frac{1}{N^3} E \sum_{x=0}^{N-1} \sum_{y=0}^{N-1} \sum_{t=0}^{Nt-1} (s(x,y,t=0) - s(x,y,t=1))^2$$

as the mean squared error between the original block of pixels and the reconstructed block of pixels. The reconstructed block of pixels is formed after truncating a number of the transform coefficients of higher frequency. As a result, the basis restriction error is expressed as:

$$BRE = \frac{1}{N^3} \left( \sum_{u=N-n}^{N-1} \sum_{v=N-n}^{N-1} \sum_{w=N-m}^{Nt-1} \right) s_{uvw}^2$$

for a unitary transform as the sum of squares of the truncated coefficients, as the n highest spatial frequency coefficients and the m highest temporal frequency coefficients are truncated.

The coefficient vector is expressed as $s_{00}=[S(0,0,1), S(0,0,2), S(0,0,3), S(0,0,5), S(0,0,6), S(0,0,7)]^T$.

The coefficient vector o is expressed in terms of the set of frame differences in the γ vector, where $\gamma=[(\gamma_1, \gamma_2, \gamma_3, \gamma_4, \gamma_6]^T$.

$$s_{00} = \begin{bmatrix} 0 & 0 & 0.98 & 0.83 & 0.55 & 0.19 \\ 1.84 & 0 & -0.92 & 0.38 & -0.38 & 0.38 \\ 0 & 0 & 0.83 & -0.19 & -0.98 & -0.55 \\ 0 & 0 & 0.55 & -0.98 & 0.19 & 0.83 \\ -0.54 & -0.92 & -0.92 & 0.54 & -0.54 & -0.92 \\ 0 & 0 & 0.19 & -0.55 & 0.83 & -0.98 \end{bmatrix} \gamma$$

Then, set $s_{00}=K\gamma$.

As a result, $s^T_{00}\, s_{00}=\gamma^T K\gamma=\gamma^T L \gamma$, where $L=K^T K$.

In an alternative embodiment of the present invention, a different metric for motion compensation is to use the magnitude, or inner product, of the coefficient vector $s_{00}$, instead of the BRE. In this approach, the magnitude $s_{00}$, $s_{00}^T s_{00}$, would be used to determine the best set of displacements that minimize the inner product. In this alternative approach, the Rayleigh quotient is used to assist in minimization of the inner product of the temporal coefficient vector $s_{00}$. The inner product of the vector $s_{00}$ can be described in terms of the frame difference vector γ and a matrix L where, $s_{00}^T s_{00} = \gamma^T L\gamma$.

The coefficient matrix can be decomposed as $L=Q^T \Lambda Q$ where $Q=[e_1, e_2, e_3, e_4, e_5, e_6]^T$ and $$\Lambda = \begin{bmatrix} \lambda_0 & 0 & 0 & 0 & 0 & 0 \\ 0 & \lambda_2 & 0 & 0 & 0 & 0 \\ 0 & 0 & \lambda_3 & 0 & 0 & 0 \\ 0 & 0 & 0 & \lambda_4 & 0 & 0 \\ 0 & 0 & 0 & 0 & \lambda_5 & 0 \\ 0 & 0 & 0 & 0 & 0 & \lambda_6 \end{bmatrix}$$

The eigenvectors $e_1$, and $e_6$ correspond to the smallest eigenvalue $\lambda_1$ and the largest eigenvalue $\lambda_6$, respectively.

The Rayleigh quotient $$R(\underline{x}) = \frac{x^T L x}{x^T x}$$

is minimized to the value $\lambda_1$ when $x=e_1$, and maximized to $\lambda_6$ when $x=e_6$.

The Rayleigh quotient is minimized when the frame difference vector $\gamma=\alpha e_1$, where α is a scaling constant with $\alpha \neq 0$. Substituting $\alpha e_1$ for x and $s_{00}^T s_{00}$ for $x^T Lx$, the Rayleigh quotient becomes $$\lambda_1 = \frac{s_{00}^T s_{00}}{\alpha^2}.$$

The coefficient vector inner product, $s_{00}^T s_{00}$, is minimized to value $\alpha_2 \lambda_1$, when $\gamma = \alpha e_1$ is satisfied for the minimum value of $|\alpha|$, $$\min_{|\alpha|} \{\min | \underline{\gamma} - \alpha \underline{\theta}_1 |\}$$

The minimization of the above is the motive for the following. Values for $\alpha$ and $\gamma$ are next determined that satisfy the above minimization equation. Where $\gamma \neq 0$ and when each component of $\gamma$ is minimized, the magnitude from $\gamma = \alpha e_1$, is taken:

$$|\alpha|_{\max} = \sqrt{\sum_{i=1}^{i=6} \gamma_{\min}^2(i)}$$

The following procedure is performed twice, once for $\alpha > 0$ and once for $\alpha < 0$. The value of $|\alpha|_{\max}$ is used to set a maximum value for $\alpha > 0$ and a minimum value for $\alpha < 0$. If $\gamma_{1+}$ is the frame difference that produces the smallest 20 value greater than $\alpha e_1(i)$, $\gamma_{1-}$ is the frame difference that produces the smallest value less than $\alpha e_1(i)$ and $\gamma_{10}$ is a frame difference such that $\gamma_{10} = \alpha e_1(i)$, all possible combinations of $\gamma_{1+}$, $\gamma_{1-}$, and $\gamma_{10}$ are formed into trial vectors $\alpha e_1$, where each trial vector is identified by its j index, to evaluate the set of frame differences that best minimize the Rayleigh quotient. Each trial vector is evaluated in the product of the Rayleigh quotient and the frame difference. The trial vector that best approximates $\alpha e_1$ is that $\alpha e_{1j}$ which minimizes $\alpha^2 e_{1j} e^T_{1j} R(\alpha e_{1j}) \forall e_{1j}$ The effectiveness of this alternative 3-D motion compensation energy compaction method of the present invention is determined by the minimum value achieved by the above trial vector. The energy in the residual motion error for the 3-D motion compensation method provides a standard method for comparison to other motion compensation methods.

Figure 11:
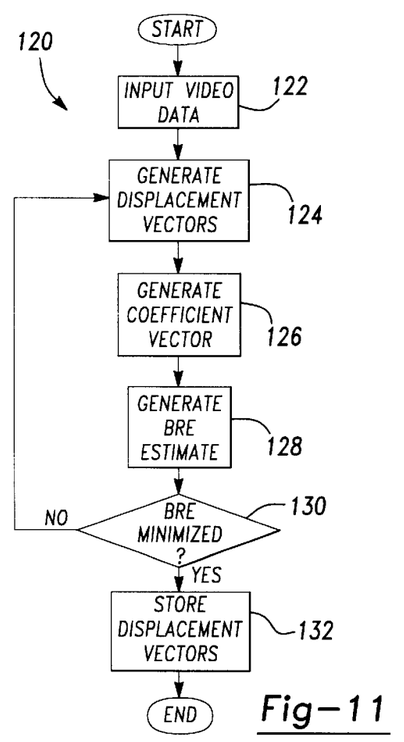
FIG. 11 is a flow diagram of the methodology of the motion compensation and energy compaction steps of a first preferred embodiment of the present invention.

The alternative method of the present invention acts to minimize the sum of the squares of the spatio-temporal frequency components of $s_{00}$, as the BRE metric for motion compensation acts to maximize the energy compaction of $s_{00}$. Such a method is synergistic with the subsequent transform process at 100 in FIG. 8, which also acts to maximize the energy compaction of the transform coefficients. The energy compaction method of the present invention reduces residual motion error in the overall data compression process, as the vector coefficient values generated through data compression method utilizing the energy compaction of the present invention are lower in energy than the corresponding vector coefficient values generated by the block matching algorithm (BMA) of conventional MPEG-2 based methods. The energy compaction method of the present invention has a performance metric that is more robust than that generated in conventional MPEG-2 schemes, and therefore has a stronger tie-in with a minimization of energy in the residual motion error. The flow diagram shown at 120 in FIG. 11 summarizes the methodology associated with motion compensation step 96 and the energy compaction step 98 of FIG. 8 in more detail. In step 122, video data is input into the data compressor. Next, the motion compensation is performed on the video data, and coefficient vectors are generated at 124, while displacement vectors are generated at 126 as discussed above in conjunction with FIG. 8. If the BRE-based energy compaction methodology of the present invention is utilized, the BRE is next generated at step 128. At step 130, the methodology determines if the BRE has been minimized. If not, the methodology returns to step 124 and repeats steps 124, 126 and 128 to minimize the BRE. If, at step 130, the methodology determines that the BRE has been minimized, the corresponding displacement vectors generated at step 124 are stored in memory at step 132.

Figure 12:
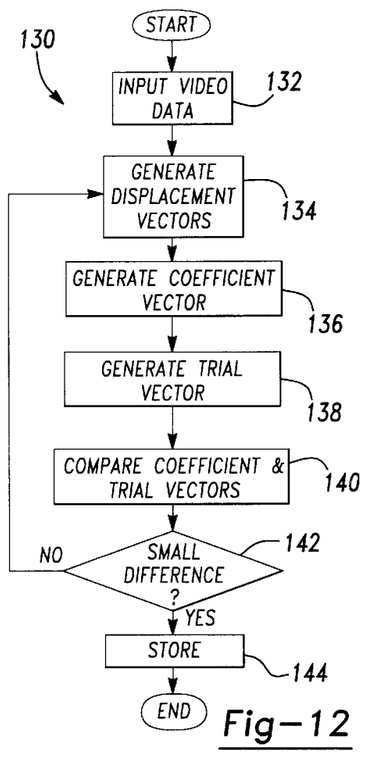
FIG. 12 is a flow diagram of the methodology of motion compensation and energy compaction steps of a second preferred embodiment of the present invention.

The methodology of the alternative embodiment of the present invention is shown in the flow diagram at 130 in FIG. 12. Steps 132, 134 and 136 correspond generally to steps 122, 124 and 126 of the flow diagram in FIG. 11. However, at step 138, the methodology generates trial vectors as described above. At step 140, coefficient and trial vectors are compared. At step 142, the methodology determines whether the difference between the coefficient and trial vectors is small. If the difference is not small, the methodology returns to step 134. Steps 134, 136, 138 and 140 are repeated until the difference between the generated trial and coefficient vectors is small. Subsequently, at step 144, the displacement vectors are stored for use in the transform process at 100 in FIG. 8.

Because the motion compensation process in MPEG provides motion vectors alone as its output, the more accurate motion vectors from the present invention could be substituted in for the MPEG motion vectors to provide a lower bit rate and lower distortion modified MPEG video compression process.

From the foregoing explanation, it should be appreciated that the video signal compression methods of the present invention provide methods for compressing digital video signals in a manner that achieves low bit rate transmission with minimal detected distortion. The method of the present invention maximizes use of energy compaction by performing an energy compaction process early on in the data compression process, thereby maximizing data compression in subsequent energy compaction dependent steps. The method of the present invention utilizes a more robust performance metric that generates coefficient values having lower energy levels than the coefficient values generated by the BMA of conventional intake two methods and thereby reduces residual motion error in data compression. The data compression method of the present invention also exhibits increased compression ratios when compared to present MPEG-1 and MPEG-2 based data compression methods while at the same time minimizes data compression complexity.

Various other advantages of the present invention will become apparent to those skilled in the art after having the benefit of studying the foregoing text and drawings, taken in conjunction with the followings claims.

What is claimed is:

1. A method of optimizing data compression in a data compression process, comprising the steps of:
   providing a signal compressor for performing video signal data compression operations;
   receiving a video signal at said signal compressor, said video signal including spatial and temporal data from a plurality of video signal frames;
   compensating for motion in said plurality of video frames by simultaneously registering said plurality of video signal frames to produce a plurality of motion vectors;
   generating a performance metric including energy compaction parameters; and applying said performance metric to said step of compensating for motion to optimize rate distortion performance therein and in subsequent data compression process steps.

2. The method of claim 1, further comprising the steps of:

transforming said conditioned spatial and temporal data from a location domain to a frequency domain after said step of applying said performance metric;

ordering said transformed spatial and temporal data coefficients into a coefficient matrix for data transmission purposes; and coding said conditioned coefficient matrix for data transmission purposes;

said step of applying said performance metric to said step of compensating for motion thereby optimizing rate distortion performance in said transforming, ordering and coding steps.

3. The method of claim 2, wherein said step of transforming comprises performing a two-dimensional discrete cosine transform on said spatial and temporal data.

4. The method of claim 1, wherein said step of generating a performance metric comprises the step of minimizing temporal coefficient vector components where the temporal coefficient vector components are for higher temporal frequencies.

5. The method of claim 4, wherein said step of minimizing temporal coefficient vector components is realized through application of the Rayleigh quotient.

6. The method of claim 1, wherein said step of applying said performance metric comprises applying a basis restriction error to a coefficient vector generated in said step of compensating for motion to minimize high temporal frequency energy for more than two of said plurality of video signal frames.

7. The method of claim 1, wherein said step of applying said performance metric comprises minimizing a coefficient vector inner product to optimize rate distortion performance.

8. A method of compressing video signal data, comprising the steps of:

providing a signal compressor for performing video compression operations;

inputting video signal data including a plurality of video frames into said signal compressor;

compensating for motion in said plurality of video frames;

compacting the energy level of said motion compensated plurality of video frames during said step of compensating for motion in said plurality of video frames;

performing a two-dimensional transformation of said video signal data from spatial and temporal position domains to a frequency domain to obtain two-dimension spatial frequency coefficients;

creating a plurality of two-dimension quantization matrices each containing two quantization coefficients corresponding to said two dimension temporal and spatial frequency coefficients from one of said video frames in said video signal;

creating a two-dimensional ordering of said transmission block from said data in said quantization matrices with an optimized distortion rate resulting from said step of compacting the temporal frequency vector energy level; and coding said data in said quantization matrices for data transmission purposes with an optimized distortion rate resulting from said step of compacting the temporal frequency vector energy level.

9. A method of transmitting a digital video signal, comprising the steps of:

compensating for motion in digital video signal data;

simultaneously compacting energy in said video signal data;

spatially and temporally transforming said digital video signal data;

quantizing said spatially and temporally transformed digital video signal data to calculate optimal transmission and signal distortion rates;

coding said spatially transformed, quantized digital video signal data;

transmitting said coded, quantized spatially transformed digital video signal information with an optimal signal distortion rate resulting from said step of compacting energy.

10. The method of claim 9, wherein said steps of transforming, compacting, quantizing, and coding are combined into a single data compression process step.

11. The method of claim 9, wherein said step of simultaneously compacting energy comprises generating a performance metric to define energy compaction in said step of compensating for motion.

12. The method of claim 11, wherein said step of generating a performance metric comprises the steps of:

generating a coefficient vector representing a plurality of frame differences from an input set of video frames;

generating a Basis Restriction Error for determining a mean squared error between an original block of pixels and a reconstructed block of pixels; and minimizing the Basis Restriction Error to maximize energy compaction.

13. The method of claim 11, wherein said step of generating a performance metric comprises the steps of:

generating a coefficient vector representing a plurality of frame differences of an input set of video frames;

calculating the magnitude of the coefficient vector; and calculating a set of displacement vectors that minimizes an inner product of the coefficient vector through use of the magnitude of the coefficient vector to thereby maximize energy compaction.

14. A data compression system, comprising:

a signal input for receiving a video signal containing a plurality of frames of video data;

a video signal compressor, comprising:

a processor that performs motion compensation on a group of video frames, that generates an energy compaction performance metric to identify temporal trends in said group of video frames, and that applies said performance metric to said group of video frames as said processor performs said motion compensation to generate a plurality of motion vectors;

a memory operatively associated with said processor that stores said group of video frames and said plurality of motion vectors during processing thereof;

said processor also being operative to transform said group of video signals into a group of frequency domain coefficients, order said transform coefficients, and code said ordered transform coefficients in an optimized manner subsequent to application of said performance metric to said group of video frames to generate compressed video signal data; and a signal output that outputs said compressed video signal data for transmission thereof.

15. An energy compaction method for an MPEG-based data compression process, comprising the steps of:

inputting video data representative of a group of video frames;

generating a plurality of displacement vectors from frame differences in said group of video frames;

generating a coefficient vector expressed in terms of said frame differences;

generating a basis restriction error estimate based on said steps of generating displacement vectors and generating a coefficient vector;

minimizing said basis restriction error to determine an optimal group of said displacement vectors; and storing said optimal group of displacement vectors for use in subsequent data compression steps.

16. A method of compacting energy in a data compression process, comprising the steps of:

inputting video data representative of a group of video frames;

generating a plurality of displacement vectors representing frame differences in said group of video frames;

generating a coefficient vector in response to said step of generating a plurality of displacement vectors;

forming a plurality of trial vectors from combinations of said frame differences in said group of video frames;

evaluating said coefficient vector through said trial vectors to determine a set of frame differences that best minimizes an associated Rayleigh quotient; and storing a set of optimal displacement vectors in response to said step of evaluating said coefficient vector for subsequent data compression.

* * * * *